United States Patent
Maresh et al.

(10) Patent No.: US 10,741,883 B2
(45) Date of Patent: Aug. 11, 2020

(54) DETECTING ABNORMAL CONDITION(S) ASSOCIATED WITH FLEXIBLE, POUCH-TYPE ENERGY STORAGE DEVICE

(71) Applicant: INTERNATIONAL BUSINESS MACHINES CORPORATION, Armonk, NY (US)

(72) Inventors: Mark Maresh, Wake Forest, NC (US); Richard John Fishbune, Rochester, MN (US); Eric B. Swenson, Pine Island, MN (US); Marc H. Coq, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/823,727

(22) Filed: Nov. 28, 2017

(65) Prior Publication Data
US 2019/0165430 A1 May 30, 2019

(51) Int. Cl.
*H01M 10/00* (2006.01)
*H01M 10/42* (2006.01)
(Continued)

(52) U.S. Cl.
CPC ..... *H01M 10/4257* (2013.01); *H01M 2/0207* (2013.01); *H01M 2/0267* (2013.01);
(Continued)

(58) Field of Classification Search
CPC ............. H01M 10/4257; H01M 10/48; H01M 2010/4271; H01M 10/4271
See application file for complete search history.

(56) References Cited

U.S. PATENT DOCUMENTS 6,610,438 B2    8/2003    Okumura et al.
6,632,571 B2    10/2003    Noh
(Continued)

FOREIGN PATENT DOCUMENTS

| KR | 20060116426 A | 11/2006 |
| KR | 20090120268 A | 5/2008 |
| WO | 2011154777 A1 | 12/2011 |

OTHER PUBLICATIONS

Simpson, Chester, "Battery Charging", Texas Instruments, Literature No. SNVA557, 2011 (pp. 1-19).

*Primary Examiner* — Nicholas P D'Aniello
(74) *Attorney, Agent, or Firm* — Tihon Poltavets, Esq.; Kevin P. Radigan, Esq.; Heslin Rothenberg Farley & Mesiti P.C.

(57) ABSTRACT

An apparatus is provided for detecting one of multiple possible abnormal conditions associated with a flexible, pouch-type energy storage device of an electronic device. The apparatus includes a stiffener, a pressure sensor and a control component. The stiffener overlies a main surface of the storage device. The pressure sensor is disposed between the stiffener and an inner surface of the electronic device to monitor for pressure between the stiffener and the inner surface indicative of an abnormal condition associated with the storage device. The control component is coupled to the pressure sensor and detects the abnormal condition based, at least in part, on the monitored pressure exceeding a specified threshold, and performs and action based thereon. The abnormal condition may include excessive external force being applied to the energy storage device, or excessive internal swelling of the energy storage device during charging, or during use.

19 Claims, 10 Drawing Sheets

(51) Int. Cl.
*H01M 10/48* (2006.01)
*H01M 2/02* (2006.01)
*H01M 2/10* (2006.01)
*H01M 10/44* (2006.01)

(52) U.S. Cl.
CPC ....... *H01M 2/1066* (2013.01); *H01M 10/445* (2013.01); *H01M 10/48* (2013.01); *H01M 2010/4271* (2013.01)

(56) References Cited

U.S. PATENT DOCUMENTS

| | | |
|---|---|---|
| 7,545,119 B1 | 6/2009 | Egan et al. |
| 8,097,352 B2 | 1/2012 | Fuse |
| 9,531,039 B2 | 12/2016 | Heubner et al. |
| 2013/0075242 A1 | 3/2013 | Lim |
| 2015/0132621 A1* | 5/2015 | Henrici ............... H01M 2/0275 429/90 |
| 2015/0171483 A1* | 6/2015 | Nenninger ........ H01M 10/4257 429/50 |
| 2016/0064780 A1* | 3/2016 | Jarvis ................ H01M 10/4257 429/50 |
| 2017/0047621 A1 | 2/2017 | Fukuda et al. |
| 2017/0155256 A1 | 6/2017 | Fujimaki et al. |
| 2017/0324122 A1* | 11/2017 | Poirier ................ H01M 2/1077 |

\* cited by examiner

DETECTING ABNORMAL CONDITION(S) ASSOCIATED WITH FLEXIBLE, POUCH-TYPE ENERGY STORAGE DEVICE

BACKGROUND

Today, many electronic devices, including mobile devices (for instance, smartphones, tablets, etc.) often use flexible pouch-type energy storage devices, which may include one or more electrochemical pouch cells, such as prismatic or pouch batteries. These energy storage devices are light weight, compact and provide high energy density. The pouch cell makes efficient use of space, for instance, achieving 90 to 95% packing efficiency. This is achieved by, in part, eliminating the metal enclosure of a traditional battery, which reduces weight, but means the cell requires support and space to expand. Pouch cell devices are used in many different applications, including consumer devices, military devices, automotive applications, etc. Currently, no standardized pouch cell exists, with each manufacturer designing the pouch cell to a desired configuration, as required for a particular application.

Pouch cells are commonly used in lithium-polymer batteries, or lithium-ion polymer batteries. These batteries are rechargeable batteries of the lithium-ion technology and use a polymer electrolyte instead of a liquid electrolyte. For instance, high conductivity semisolid (gel) polymers form the electrolyte. Advantageously, such batteries provide higher specific energy then other lithium-battery types, and are often used in applications where weight may be a critical consideration, such as tablet computers, smartphones, handsets, radio controlled aircraft, etc.

SUMMARY

Certain shortcomings of the prior art are overcome and additional advantages are provided through the provision, in one embodiment, of an apparatus which includes a stiffener, a pressure sensor, and a control component. The stiffener overlies a main surface of an energy storage device of an electronic device, where the energy storage device is a flexible, pouch-type energy storage device. The pressure sensor is disposed between the stiffener and an inner surface of the electronic device to monitor for pressure between the stiffener and the inner surface indicative of an abnormal condition associated with the energy storage device. The control component is coupled to the pressure sensor, and detects the abnormal condition based, at least in part, on the monitored pressure at the pressure sensor exceeding a specified threshold, and performs an action based on detecting the abnormal condition.

In another aspect, an electronic device is provided which includes an energy storage device for powering the electronic device. The energy storage device is a flexible, pouch-type energy storage device. The electronic device further includes an apparatus for detecting an abnormal condition associated with the energy storage device. The apparatus includes a stiffener, a pressure sensor, and a control component. The stiffener overlies a main surface of the energy storage device, and the pressure sensor is disposed between the stiffener and an inner surface of the electronic device to monitor for pressure between the stiffener and the inner surface indicative of an abnormal condition associated with the energy storage device. The control component is coupled to the pressure sensor, and detects the abnormal condition based, at least in part, on the monitored pressure at the pressure sensor exceeding a specified threshold, and performs an action based on detecting the abnormal condition.

In a further aspect, a method is provided which includes fabricating an apparatus to facilitate detecting an abnormal condition associated with an energy storage device of an electronic device. The fabricating includes providing a stiffener overlying a main surface of the energy storage device of the electronic device, where the energy storage device is a flexible, pouch-type energy storage device, and providing a pressure sensor disposed between the stiffener and an inner surface of the electronic device to monitor for pressure between the stiffener and the inner surface indicative of the abnormal condition associated with the energy storage device. Further, fabricating the apparatus includes providing a control component coupled to the pressure sensor. The control component detects the abnormal condition based, at least in part, on the monitored pressure at the pressure sensor exceeding a specified threshold, and performs an action based on detecting the abnormal condition.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
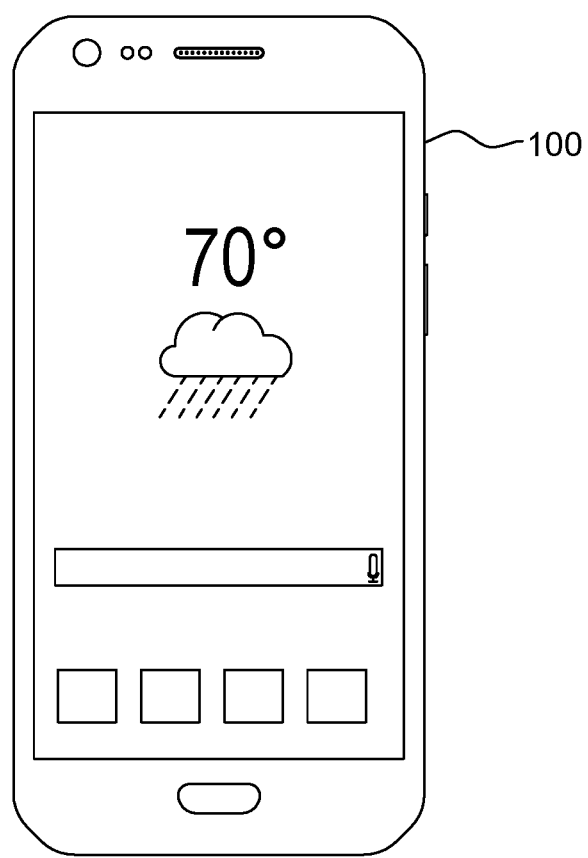
FIG. 1A depicts one embodiment of an electronic device, which internally has one or more energy storage devices and an apparatus to detect one or more abnormal condition associated with the energy storage device(s), in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, to facilitate detecting an abnormal condition associated with a pouch-type energy storage device, and taking action based thereon.

The illustrative embodiments may be described, in part, using specific code, designs, architectures, protocols, layouts, schematics, or tools only as examples, and are not limiting to the illustrative embodiments. Furthermore, the illustrative embodiments are described in some instances using particular data processing environments only as example for clarity of the description. The illustrative embodiments may be used in conjunction with other comparable or similarly purposed structures, systems, applications, or architectures. An illustrative embodiment may be implemented, at least in part, in hardware, software, or a combination of hardware and software.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As noted, many electronic devices such as mobile devices (for instance, smartphones, tablets, handsets, etc.) today use flexible, pouch-type energy storage devices to power the devices. Lithium-polymer batteries are one example of such energy storage devices. Note that as used herein the phrase "energy storage device" refers to, for instance, a prismatic or pouch energy storage device or battery which is flexible and configured for swelling in operation. A disadvantage of such energy storage devices is that they may be subject to excessive swelling, for instance, due to overcharging, or could be damaged if excess external force is applied, which could lead to device failure and/or a thermal event occurring.

Figure 1B:
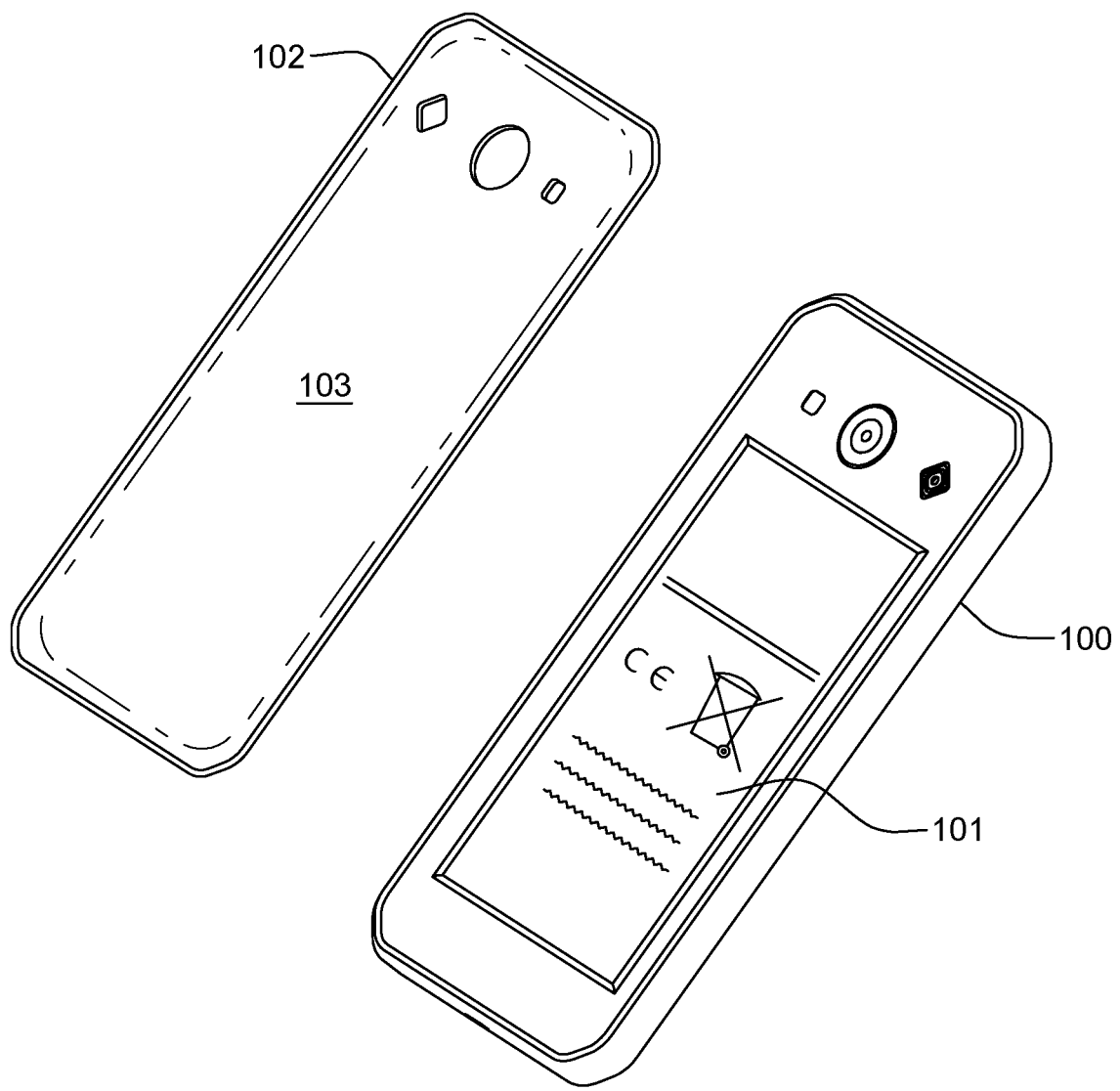
FIG. 1B depicts a back view of the electronic device of FIG. 1A, with the back cover removed, exposing the energy storage device to be monitored for an abnormal condition associated therewith, in accordance with one or more aspects of the present invention.

FIGS. 1A & 1B depict one embodiment of an electronic device 100, such as a smartphone, tablet, etc. As shown in FIG. 1B, electronic device 100 includes one or more energy storage devices 101, which in one or more embodiments, are each a flexible, pouch-type energy storage device common today in many different applications, including consumer devices, military devices, automotive devices, etc. By way of example only, energy storage device 101 may be a lithium-polymer battery. In the embodiment of FIGS. 1A & 1B, electronic device 100 includes a back cover 102 which when removed allows access to energy storage device(s) 101. In implementation, a specified amount of space may be provided between energy storage device 101 and the inner surface 103 of back cover 102 when in operative position to allow for normal swelling of energy storage device 101, for instance, during charging of the storage device.

Figure 2:
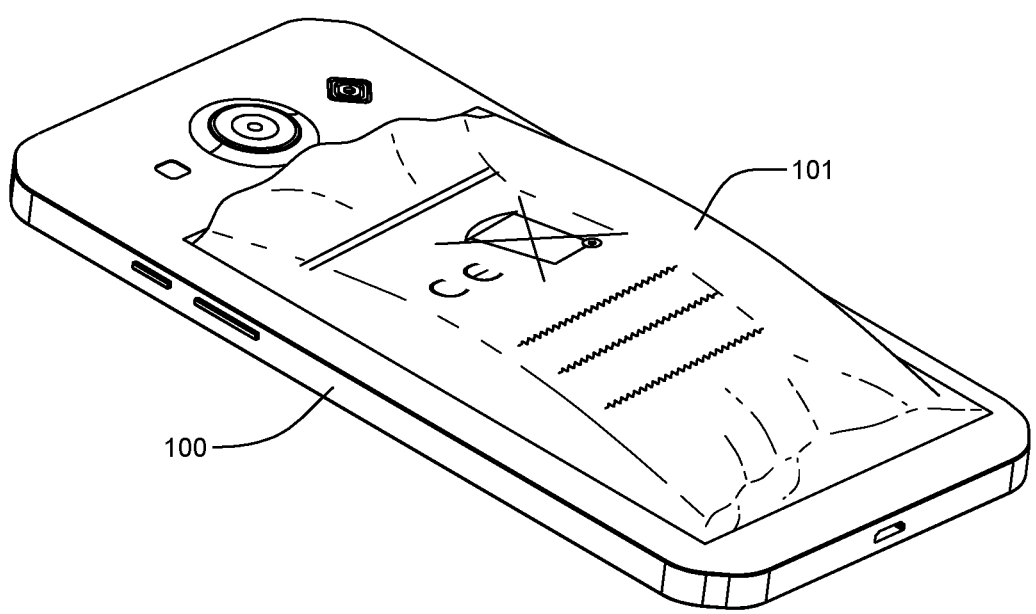
FIG. 2 illustrates a pouch-type energy storage device of an electronic device with excessive internal swelling, which may be detected by an apparatus, in accordance with one or more aspects of the present invention.

FIG. 2 depicts an example of an energy storage device 101, such as discussed herein, with excessive swelling. As known, pouch-type energy storage devices may swell, for instance, due to pressure generated from the evaporation of water that is heated during the charging operation. Overcharging is one of the reasons the storage devices swell. Another concern addressed herein is the possibility of excessive external pressure being applied to the energy storage device, such as by an individual sitting on the electronic device with the device in their back pocket. Along with detecting an abnormal condition associated with the energy storage device, the apparatuses and processes disclosed herein take action proactively to, for instance, restrict battery charging or use of the battery, or even shutting down of the electronic device to avoid or limit damage to the energy storage device or electronic device and/or injury to a user of the electronic device.

Generally stated, disclosed herein are apparatuses and methods to facilitate detecting abnormal conditions, such as those noted above, associated with a flexible, pouch-type energy storage device. In one or more embodiments, the apparatus includes a stiffener overlying a main surface of the energy storage device of an electronic device, where as noted, the energy storage device is a flexible, pouch-type energy storage device such as a prismatic or pouch battery. The apparatus also includes a pressure sensor disposed between the stiffener and an inner surface of the electronic device to monitor for pressure between the stiffener and the inner surface of the electronic device indicative of an abnormal condition associated with the energy storage device. A control component is provided coupled to the pressure sensor to monitor pressure at the pressure sensor. The control component detects the abnormal condition based, at least in part, on the monitored pressure exceeding a specified threshold, and performs an action based on detecting the abnormal condition.

As explained herein, the abnormal condition may be any of the multiple conditions, such as pressure placed on the energy storage device by an external force and/or detection of swelling of the energy storage device which is out of specification for the device. Advantageously, the pressure sensor can detect incremental increases in pressure, for instance, between the stiffener and the inner surface of the electronic device. This information may be used to proactively take action by the control component to avoid or limit damage to the energy storage device or electronic device, and/or to prevent injury to a user of the electronic device.

For instance, the control component may identify during charging of the energy storage device a monitored pressure at the pressure sensor exceeding a specified threshold indicative of the abnormal condition, and based thereon, limit, or shut down, charging of the energy storage device, or even shutdown the electronic device itself should the pressure become too high, for instance, equal to an upper acceptable pressure threshold. Advantageously, the limit or shutdown mode can be reversed once the pressure is reduced. The pressure sensor can also warn (e.g., by sound, vibration and/or text) of excessive external pressure being placed on the energy storage device by an external force, such as a force resulting from a user sitting on the electronic device in the case of a smartphone.

Note that the apparatus disclosed herein is external to the energy storage device. This means that the apparatus and methods disclosed may be used in combination with any storage device manufacturer without dependencies on the particular battery manufacturer. Further, pressure can be measured in increments, which means that incremental action may be taken to prevent permanent damage to the energy storage device, such as slowing and then shutting down charging. In addition, the method disclosed can measure external pressure force being applied to the energy storage device, so that a user of the device may be aware that they could potentially be damaging the storage device by their misuse of the device. In one or more implementations, a raised contact surface may be provided above or below the pressure sensor, which can be adjusted so that a single pressure sensor may be used across multiple energy storage device types and across multiple electronic devices. For instance, by reducing the contact surface area, the amount of pressure needed to achieve a specified pressure reading is decreased, and vice versa. In one or more embodiments, the pressure sensor(s) may be any of a variety of flat, thin film pressure sensors, which are currently available and very cost competitive.

Advantageously, in one or more embodiments, a single pressure sensor may be used to measure internally generated pressure of the energy storage device that is exerted outwards, for instance, on the electronic device casing, as well as an external pressure that may be applied or inflicted inward onto the energy storage device. As explained herein, the provision of a stiffener mechanism such as a stiffener plate on or over the flexible, pouch-type energy storage device provides an ability to measure pressure in increments, for instance, as the device swells, or external pressure is being applied to the device.

Figure 3A:
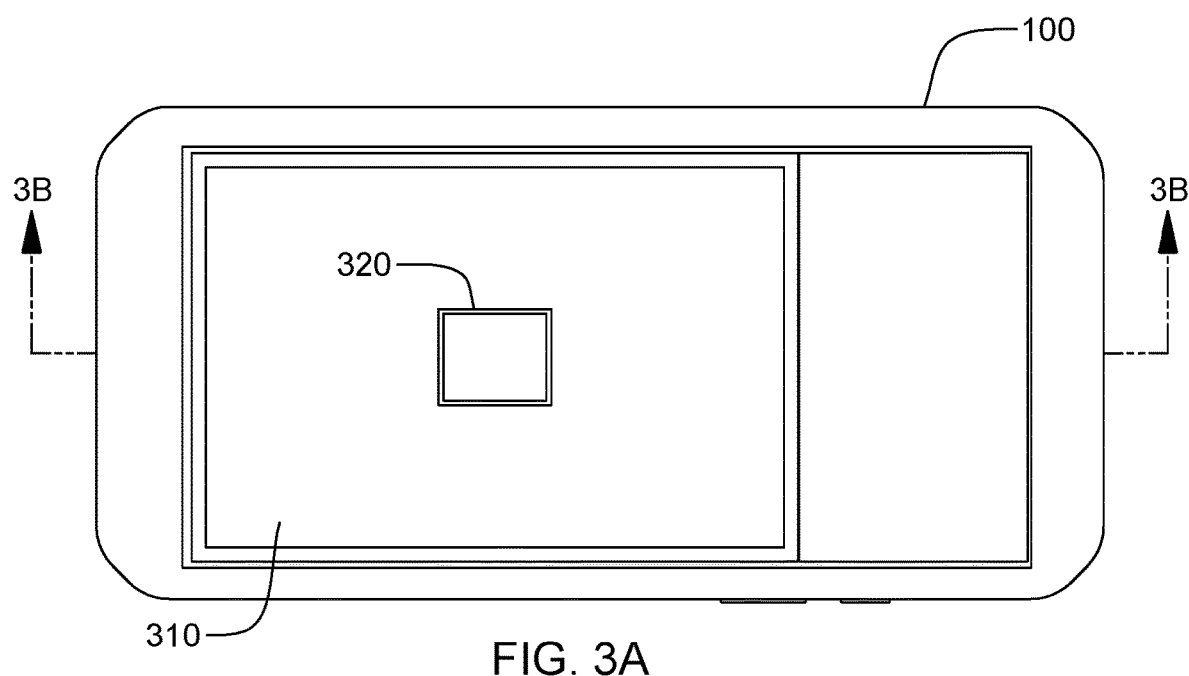
FIG. 3A is a plan view of one embodiment of an electronic device, with an energy storage device of the flexible, pouch cell type, and an apparatus associated therewith to monitor for an abnormal condition, in accordance with one or more aspects of the present invention.
Figure 3B:
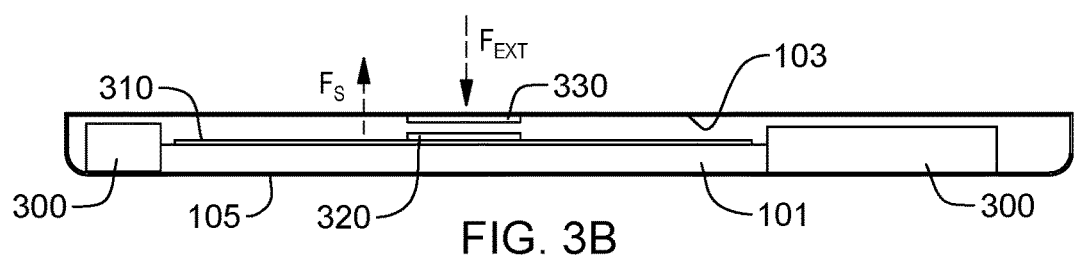
FIG. 3B is a cross sectional elevational view of the electronic device and apparatus of FIG. 3A, taken along line 3B-3B thereof, in accordance with one or more aspects of the present invention.

As noted above, it is typical of many electronic devices, such as mobile devices, to use pouch-type batteries (or energy storage devices), and to locate them behind a removable back cover of the device, such as shown in FIG. 1B. FIG. 3A depicts a plan view of such an electronic device 100 with the back cover removed, for instance, to allow access to energy storage device 101, as well as electronics 300 of the electronic device 100. FIG. 3B is a cross sectional elevational view of the electronic device of FIG. 3A, taken along line 3B-3B thereof, and with the back cover 102 of electronic device 100 shown in operative position.

Referring collectively to FIGS. 3A & 3B, in the embodiment depicted the flexible, pouch-type energy storage device (e.g., prismatic or pouch battery) sits on an internal surface 105 of electronic device 100, such as the bottom surface of an electronic device 100 in the orientation of FIGS. 3A & 3B. In this configuration, as the device starts to swell, the swelling motion is in the upward direction in the orientation of FIGS. 3A & 3B. Alternatively, there may be another structure underneath energy storage device 101, as well as at the sides or edges of the device so that as the device starts to swell, for instance, with charging of the device, the swelling motion is in the upward direction (again in the orientation of FIGS. 3A & 3B).

In one or more embodiments, the apparatus includes a stiffener 310, such as a stiffener plate placed over a main surface of energy storage device 101, as illustrated. By way of example, stiffener 310 may be a stiffener plate that rests directly on the main surface of energy storage device 101 opposite to the main surface of the energy storage device resting on or against internal surface 105 of electronic device 100. In the embodiment illustrated, and by way of example only, stiffener 310 has a surface area substantially matching the surface area of the main surface of energy storage device 101. The configuration depicted in FIGS. 3A & 3B ensures that any swelling of energy storage device 101 will be evenly distributed across stiffener 310. Note that, in the embodiment illustrated, there is a single stiffener plate, but many other configurations are possible. For instance, there may be a second stiffener plate on the opposite main surface of energy storage device 101 between energy storage device 101 and, for instance, internal surface 105 of electronic device 100.

Figure 4:
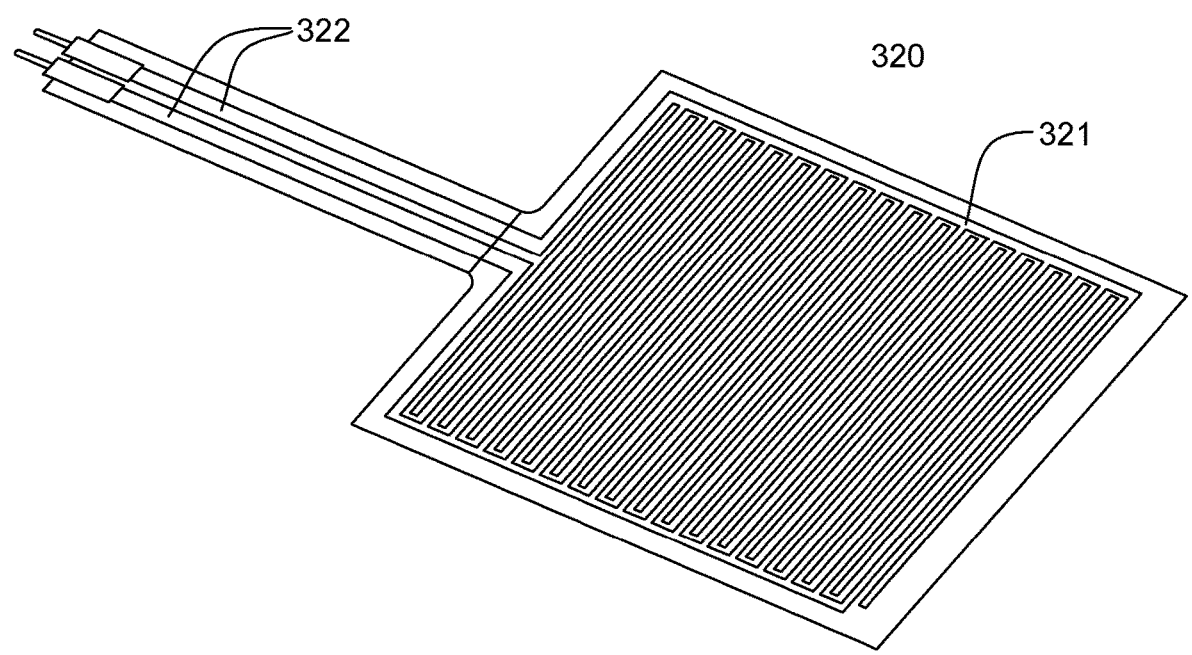
FIG. 4 depicts one embodiment of a pressure sensor which may be used in an apparatus such as depicted in FIGS. 3A & 3B, in accordance with one or more aspects of the present invention.

In the embodiment illustrated, a single pressure sensor 320 is located over stiffener 310, for instance, in a central region of energy storage device 101. To reduce the amount of space required within electronic device 100, a commercially available flat, thin pressure sensor could be used, such as depicted in FIG. 4. Such pressure sensors are available from a variety of sources, including Interlink Electronics of Camarillo, Calif., USA. As depicted in FIG. 4, pressure sensor 320 may be a force sensing resistor type sensor which, in one or more embodiments, may be formed of polymer thick film and configured to, for instance, exhibit a decrease in resistance with increase in force applied to the sensing surface 321 of the sensor. For instance, in one or more implementations, two membranes may be separated by a thin airgap, with the airgap being maintained by a spacer around the edge, and by the rigidity of the two membranes. One of the membranes has two sets of interdigitated fingers which are electrically distinct, and with each set connecting to one trace 322. When pressed, the overlying layer, which may include a printed carbon base ink, shorts the two traces together with a resistance that depends on the applied force. A simple force-to-voltage conversion may be used to, for instance, tie the pressure sensor device to a measuring resistor in a voltage divider configuration. In the embodiment depicted, the pressure or force being applied is the force applied within the sensing surface 321. In one or more embodiments, a pressure sensor 320 such as depicted in FIG. 4 may be directly adhered to stiffener 310, or alternatively, to inner surface 103 of back cover 102 of electronic device 100.

In the embodiment depicted in FIGS. 3A & 3B, inner surface 103 of back cover 102 has a raised contact surface 330 aligned to overlie pressure sensor 320, with a small gap being provided between raised contact surface 330 and pressure sensor 320 by design. Raised contact surface 330 may be provided to ensure that when a force (such as an external force ($F_{ext}$) or swelling force ($F_s$)) presses the stiffener plate against the rear cover, the leads or traces 322 (FIG. 4) extending from pressure sensor 320 will not also be compressed or damaged. It also allows for adjustment of the contact area directly on pressure sensor 320. For instance, to make the apparatus more sensitive to pressure, raised contact surface 330 may have a surface area that is smaller than the contact surface area of the pressure sensor 320. To make the device less sensitive to pressure, the raised contact surface area may be increased, for instance, to be the same size as the contact surface area of pressure sensor 320. In one or more implementations, raised contact surface 330 could be a permanent part of back cover 102, or alternatively, it could be added as a secondary feature to the cover, for instance, as an adhesive attachment. As noted, the raised contact surface could also be a feature on stiffener 310, with the pressure sensor being disposed on the inner surface 103 of back cover 102. In another configuration, the raised contact surface could be a feature on a second stiffener that is placed over the top of the first stiffener, so that the pressure sensor is between both stiffeners, for instance, between two stiffener plates, and the raised contact surface of the second stiffener plate is directly above (or under) the pressure sensor.

Figure 5:
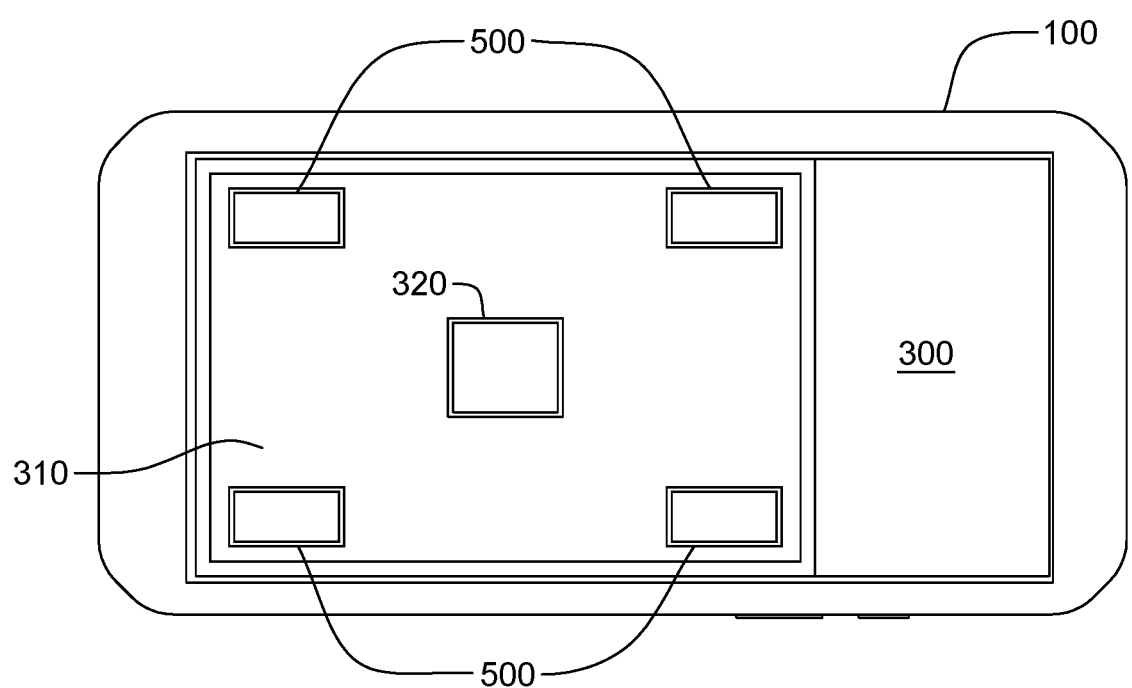
FIG. 5 depicts a further embodiment of an electronic device, with an energy storage device of the flexible, pouch cell type, and an alternate embodiment of an apparatus associated therewith to monitor for an abnormal condition, in accordance with one or more aspects of the present invention.

In addition to one or more stiffeners, multiple pressure sensors (and multiple raised contact surfaces) such as described herein could be employed. FIG. 5 depicts one example of such a structure where, in addition to pressure sensor 320, pressure sensors 500 are provided over edge regions of the main surface of energy storage device 101, such as at the corners of energy storage device 101. This configuration would advantageously allow for increased sensitivity to pressure, such as an external force or pressure, being applied to a certain portion of the energy storage device, such as along the periphery of the device.

Figure 6:
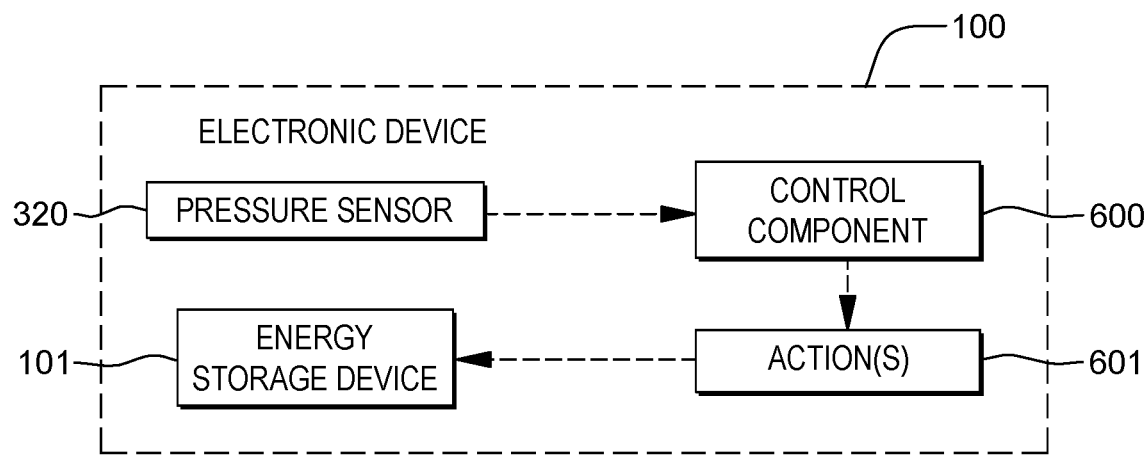
FIG. 6 is a block diagram representation of an electronic device with an apparatus for monitoring pressure associated with the energy storage device thereof, and for taking action should an abnormal condition be detected, in accordance with one or more aspects of the present invention.

FIG. 6 is a block diagram representation of certain components of an apparatus such as disclosed herein, shown within an electronic device 100. As shown, energy storage device 101 resides within electronic device 100 and has disposed over it a pressure sensor 320, with in one or more embodiments, a stiffener disposed between the pressure sensor and the energy storage device, such as the stiffener plate described above in connection with FIGS. 3A-5. A control component 600 is operatively coupled to pressure sensor 320 to allow monitoring of pressure at the pressure sensor. As explained further herein, control component advantageously performs one or more actions 601 based on the monitored pressure exceeding one or more specified thresholds indicative of one or more abnormal conditions. In one or more embodiments, control component 600, as well as supporting components to perform action(s) 601 reside within electronic device 100, such as within or coupled to a computing environment of the electronic device, such as explained further below.

Control component 600 of FIG. 6 may be configured, or programmed, to detect a variety of abnormal conditions associated with the flexible, pouch-type energy storage device that could cause permanent damage to the device, or other safety issues. FIGS. 7A-7D depict one embodiment of processing implemented by the control component of an apparatus, in accordance with one or more aspects of the present invention.

Figure 7A:
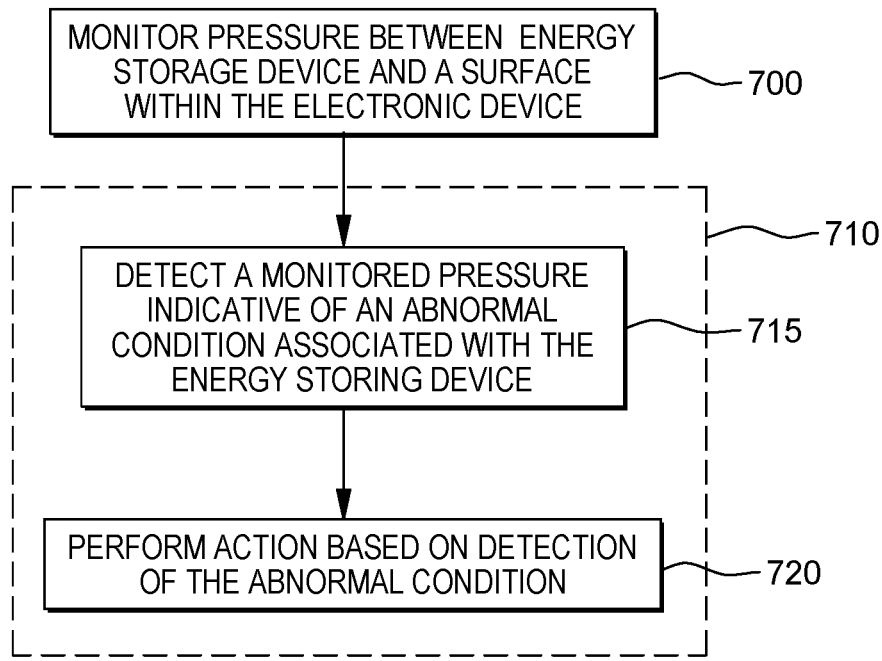
FIGS. 7A-7D depict one embodiment of control component processing, in accordance with one or more aspects of the present invention.

As shown in FIG. 7A, pressure is monitored between the energy storage device and a surface within the electronic device 700, such as an inner surface of a back cover in the example described above. While monitoring pressure, the control component determines whether there is an abnormal condition associated with the energy storage device which requires action to be taken 710. In particular, processing may detect a monitored pressure indicative of an abnormal condition associated with the energy storage device 715, and based thereon perform an action 720.

Figure 7B:
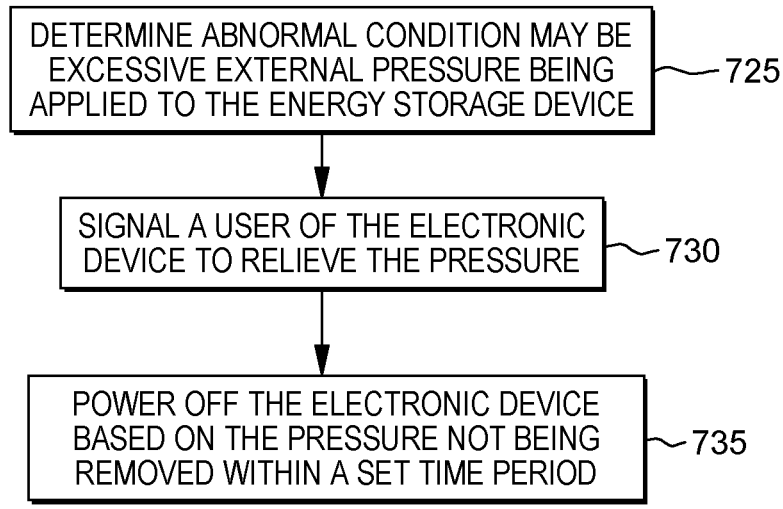

For instance, as depicted in FIG. 7B, the control component may determine that an abnormal condition exists, for instance, due to an excessive external pressure being applied to (or excessive internal pressure being generated within) the energy storage device 725. Based on this, processing may signal a user of the electronic device to relieve the pressure 730. For instance, the control component may signal the user with an audible tone, and/or turn on the phone vibration function, or send a text. If the user does not remove, or relieve, the pressure within a set time period, then the control component may power off the electronic device 735.

Figure 7C:
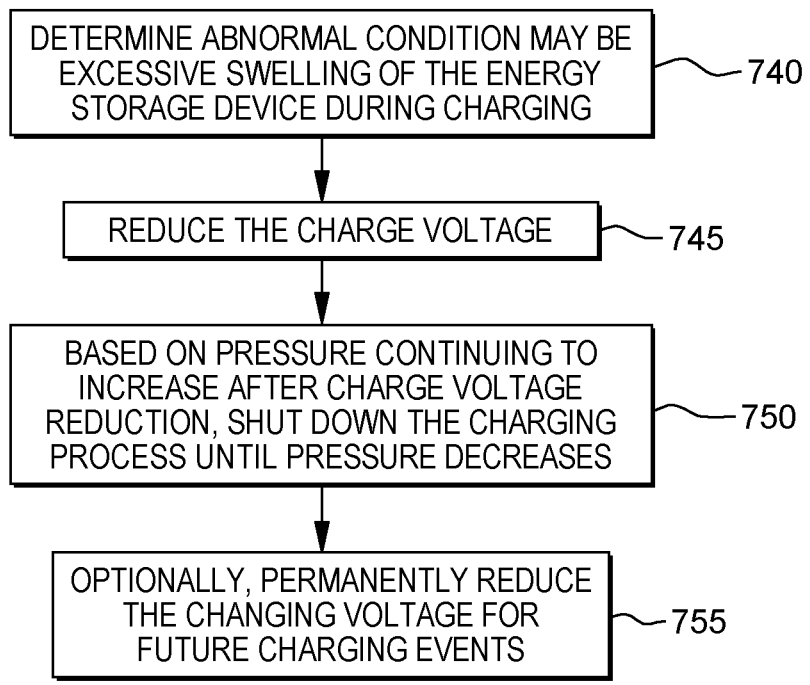

FIG. 7C depicts further processing which may be implemented by the control component, which includes determining that an abnormal condition exists due to excessive swelling of the energy storage device during charging 740. For instance, the pressure sensor may detect a pressure increase outside the normal range during charging of the energy storage device. In such a case, the charge voltage being applied to the energy storage device may be reduced 745, for instance, by 10-25%. Based on the pressure continuing to increase after the voltage reduction in the charge voltage, processing may shut down the charging process until pressure decreases 750. Optionally, in one or more implementations, the charging voltage could be permanently reduced for future charging events 755 to avoid the excessive swelling.

Figure 7D:
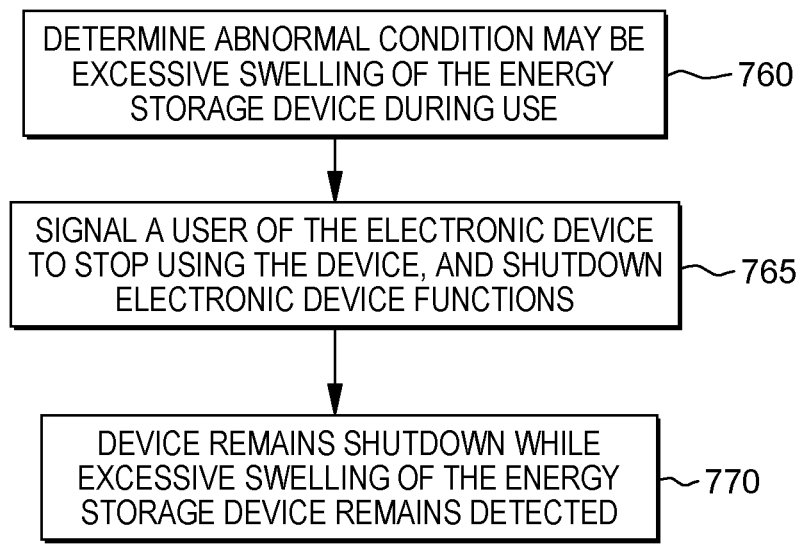

FIG. 7D depicts further processing which may be implemented by the control component. This process includes determining that the abnormal condition is an excessive swelling of the energy storage device that is occurring during use of the device 760. Based on this determination, a user of the device may be signaled to stop using the device, and one or more electronic device functions may be shut down 765. For instance, the user may be signaled with an alarm to let the user know to stop using the device. The device remains shut down while excessive swelling of the energy storage device remains detected 770. Note that the detected abnormal condition in this case is indicative of something wrong with the electronic device or energy storage device, and that there is potential for damage, such as a thermal event or explosion. The device may be placed into a state that prevents the user from using the device while the excessive pressure on the flexible, pouch-type energy storage device remains detected.

Figure 8:
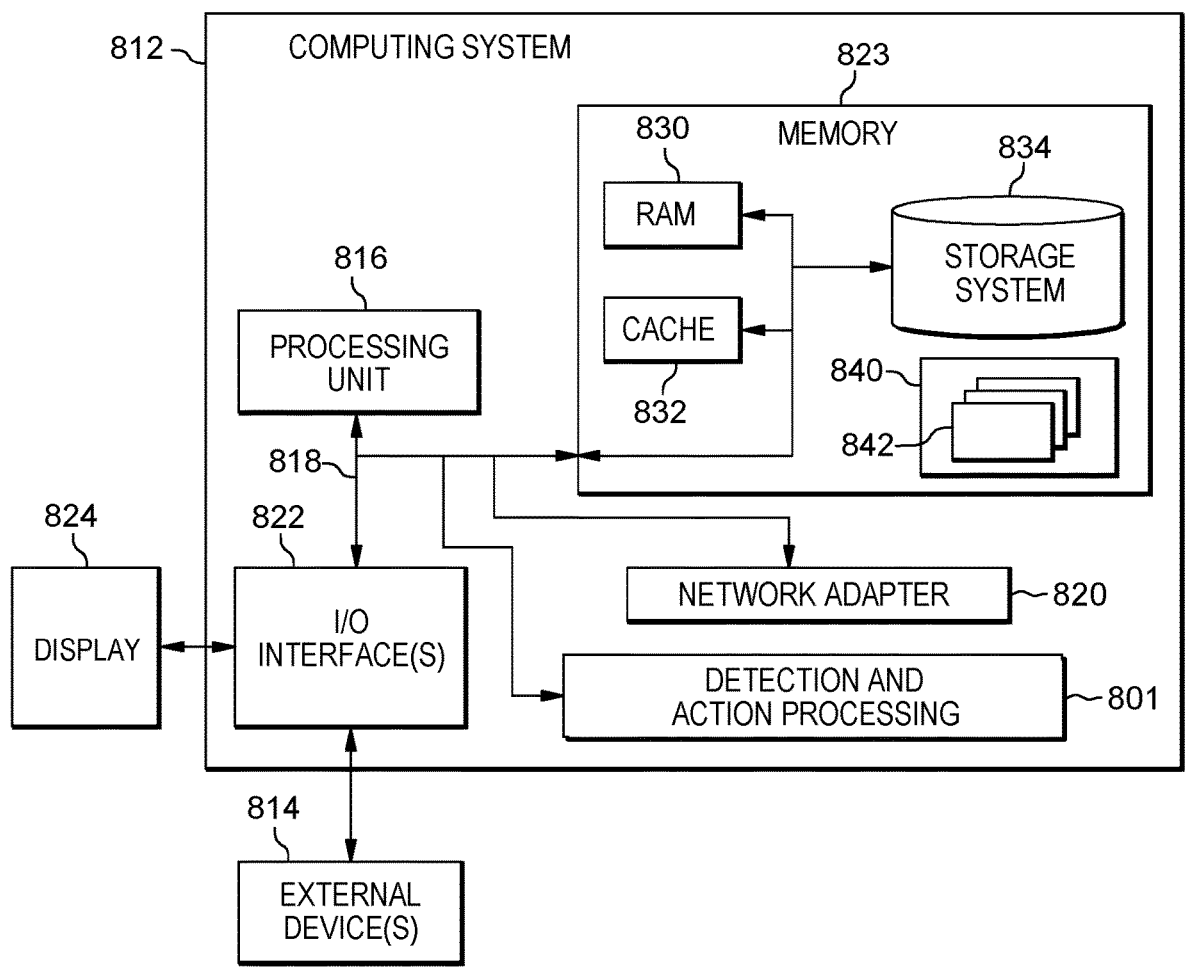
FIG. 8 depicts one embodiment of a computing system of, or associated with, an electronic device, and having detection and action processing associated therewith, in accordance with one or more aspects of the present invention.

By way of further example, FIG. 8 depicts one embodiment of a computing environment 800, which includes a computing system 812. Examples of well-known computing systems, environments, and/or configurations that may be suitable for use with computer system 812 include, but are not limited to, a mobile device, such as a wireless computer, a handheld or laptop computer or device, a mobile phone, a programmable consumer electronic device, a tablet, a personal digital assistant (PDA), or the like.

Computing system 812 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 8, computing system 812, is shown in the form of a general-purpose computing device. The components of computing system 812 may include, but are not limited to, one or more processors or processing units 816, a system memory 823, and a bus 818 that couples various system components including system memory 823 to processor 816.

In one embodiment, processor 816 may be based on any one of multiple available operating system architectures, including mobile device operating systems.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 may include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 may include at least one program product having a set (e.g., at least one) of program modules that are configured to carry out the functions of embodiments of the invention.

Program/utility 840, having a set (at least one) of program modules 842, may be stored in memory 823 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Alternatively, a separate, detection and action processing system, module, logic, etc., 801 may be provided within computing environment 812.

Computing system 812 may also communicate with one or more external devices 814 such as a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects of the present invention, such as one or more aspects of the control component, may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An apparatus comprising:
   an electronic device having an outer casing, the electronic device being a handheld electronic device, and the outer casing being an outer casing of the handheld electronic device;
   a stiffener plate overlying a main surface of an energy storage device of the electronic device, between the energy storage device and the outer casing of the electronic device, the stiffener plate being a rigid structure distinct from the energy storage device, and the energy storage device being a flexible, pouch-type energy storage device;
   a pressure sensor disposed between the stiffener plate and the outer casing of the electronic device to monitor for contact pressure between the stiffener plate and the outer casing indicative of an abnormal condition, the pressure sensor being a force sensing sensor located between the stiffener plate and the outer casing of the electronic device, and the abnormal condition being from a group of abnormal conditions consisting of a swelling of the energy storage device which is out of specification for the energy storage device, and an excessive external force being applied to the outer casing directed inward towards the energy storage device; and
   a control component coupled to the pressure sensor, the control component configured to detect multiple abnormal conditions, including out of specification swelling of the energy storage device and excessive, external force being applied to the outer casing directed inward towards the energy storage device, based, at least in part, on monitored pressure at the pressure sensor exceeding a specified threshold, and the control component configured to proactively perform an electronic device action based on detecting the abnormal condition.

2. The apparatus of claim 1, wherein the abnormal condition comprises the excessive external force being applied to the electronic device.

3. The apparatus of claim 2, wherein the action comprises signaling to a user of the electronic device to relieve the excessive external force.

4. The apparatus of claim 3, wherein the control component action further comprises powering off the electronic device based on the abnormal condition not being removed within a set time period after signaling to the user.

5. The apparatus of claim 1, wherein the abnormal condition comprises excessive swelling of the energy storage device during charging of the energy storage device.

6. The apparatus of claim 5, wherein the action comprises reducing a charge voltage to the energy storage device.

7. The apparatus of claim 6, wherein based on the monitored pressure continuing to increase after the reducing of the charge voltage, the action further comprises shutting down charging of the energy storage device until the monitored pressure decreases to below the specified threshold.

8. The apparatus of claim 1, wherein the abnormal condition comprises excessive swelling of the energy storage device during use of the electronic device, and the action comprises signaling a user of the electronic device, and shutting down one or more electronic device functions.

9. The apparatus of claim 1, wherein the stiffener plate is sized to cover the main surface of the energy storage device, between the energy storage device and a back cover of the outer casing.

10. The apparatus of claim 9, wherein the pressure sensor is affixed to one of the stiffener plate or the outer casing of the electronic device, and the other of the stiffener plate and the outer casing of the electronic device further comprises a raised contact surface aligned to contact the pressure sensor with occurrence of the abnormal condition.

11. The apparatus of claim 10, wherein the raised contact surface has a smaller contact surface area than a contact surface area of the pressure sensor.

12. The apparatus of claim 1, further comprising at least one other pressure sensor disposed between the stiffener plate and the outer casing of the electronic device, the pressure sensor being disposed over a central region of the main surface of the energy storage device, and the at least one other pressure sensor being disposed over at least one edge region of the main surface of the energy storage device.

13. A mobile device comprising:
   an outer casing, the outer casing being an outer casing of the mobile device;
   an energy storage device for powering the mobile device, the energy storage device being a flexible, pouch-type energy storage device; and
   an apparatus for detecting an abnormal, the apparatus comprising:
      a stiffener plate overlying a main surface of the energy storage device, between the energy storage device and the outer casing, the stiffener plate being a rigid structure distinct from the energy storage device;
      a pressure sensor disposed between the stiffener and the outer casing of the mobile device to monitor for contact pressure between the stiffener and the outer casing indicative of the abnormal condition, the pressure sensor being a force sensing sensor located between the stiffener plate and the outer casing of the mobile device, and the abnormal condition being from a group of abnormal conditions consisting of a swelling of the energy storage device which is out of specification for the energy storage device, and an excessive external force being applied to the outer casing directed inward towards the energy storage device; and
      a control component coupled to the pressure sensor, the control component configured to detect multiple abnormal conditions, including out of specification swelling of the energy storage device and excessive, external force being applied to the outer casing directed inward towards the energy storage device, based, at least in part, on monitored pressure at the pressure sensor exceeding a specified threshold, and the control component configured to proactively perform a mobile device action based on detecting the abnormal condition.

14. The mobile device of claim 13, wherein the abnormal condition comprises excessive external force being applied to the mobile device, and the action comprises signaling to a user of the mobile device to relieve the abnormal condition.

15. The mobile device of claim 13, wherein the abnormal condition comprises excessive swelling of the energy storage device during charging of the energy storage device, and the action comprises reducing a charge voltage to the energy storage device.

16. The mobile device of claim 13, wherein the abnormal condition comprises excessive swelling of the energy storage device during use of the electronic device, and the action comprises signaling a user of the electronic device, and shutting down one or more electronic device functions.

17. The mobile device of claim 13, wherein the stiffener plate is sized to cover the main surface of the energy storage device, between the energy storage device and a back cover of the outer casing.

18. The mobile device of claim 17, wherein the pressure sensor is affixed to one of the stiffener plate or the outer casing of the mobile device, and the other of the stiffener plate and the outer casing of the mobile device further comprises a raised contact surface aligned to contact the pressure sensor with occurrence of the abnormal condition.

19. The mobile device of claim 18, wherein the raised contact surface has a smaller contact surface area than a contact surface area of the pressure sensor.

* * * * *